US006037541A

United States Patent [19]

Bartley et al.

[11] Patent Number: 6,037,541

[45] Date of Patent: Mar. 14, 2000

[54] APPARATUS AND METHOD FOR FORMING A HOUSING ASSEMBLY

[75] Inventors: Paul Bartley, West Newbury, Mass.; Lucy Bartley, Chester, N.H.

[73] Assignee: Bartley R.F. Systems, Inc., Amesbury, Mass.

[21] Appl. No.: 09/037,408

[22] Filed: Mar. 10, 1998

Related U.S. Application Data

[63] Continuation of application No. 08/412,030, Mar. 23, 1995, Pat. No. 5,841,330.

[51] Int. Cl.[7] ...................................................... H02G 3/14

[52] U.S. Cl. .......................... 174/66; 174/35 R; 220/3.8; 220/241

[58] Field of Search ............................. 174/50, 66, 35 R, 174/35 C; 220/3.8, 241

[56] References Cited

U.S. PATENT DOCUMENTS

| | | | |
|---|---|---|---|
| 2,637,782 | 5/1953 | Magnuski . | |
| 2,995,806 | 8/1961 | Allison et al. | 29/155.5 |
| 3,010,199 | 11/1961 | Smith et al. | 29/509 |
| 3,124,768 | 3/1964 | Tilston . | |
| 3,737,816 | 6/1973 | Honicke | 333/212 |
| 3,774,799 | 11/1973 | Heisterberg | 220/26 R |
| 3,899,756 | 8/1975 | Hines et al. | 333/73 |
| 4,291,288 | 9/1981 | Young et al. | 333/212 |
| 4,453,146 | 6/1984 | Fiedziusako | 333/212 |
| 4,477,785 | 10/1984 | Atia | 333/202 |
| 4,688,692 | 8/1987 | Humbs et al. | 220/3.8 |
| 4,761,624 | 8/1988 | Igarashi et al. | 333/202 X |
| 4,821,006 | 4/1989 | Ishikawa et al. | 333/219.1 |
| 5,159,537 | 10/1992 | Okano | 174/35 R X |
| 5,175,395 | 12/1992 | Moore | 174/35 R |
| 5,220,300 | 6/1993 | Snyder | 333/212 X |
| 5,608,363 | 3/1997 | Cameron et al. | 333/202 |

*Primary Examiner*—Dean A. Reichard
*Attorney, Agent, or Firm*—Wolf, Greenfield & Sacks, P.C.

[57] ABSTRACT

An apparatus and method for forming a housing assembly. The assembly comprises a first part with protrusions spaced along at least one surface which fit into through-holes in a second part and which may, when the parts are placed together, be peened such that the protrusions fill the through-holes and join the parts. The method comprises fabricating a first part with protrusions and a second part with through-holes, joining the parts together such that the protrusions mate with the through-holes, and peening the protrusions such that they fill the through-holes and join the parts.

26 Claims, 16 Drawing Sheets

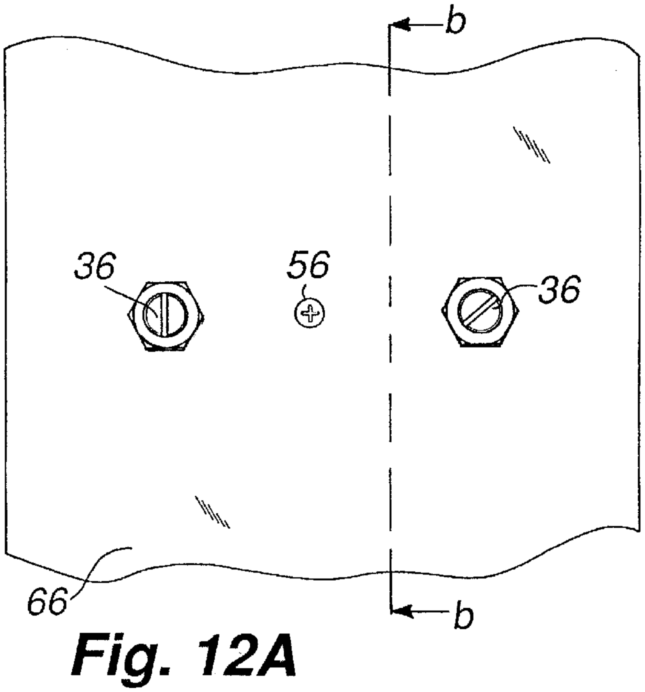
Fig. 12A
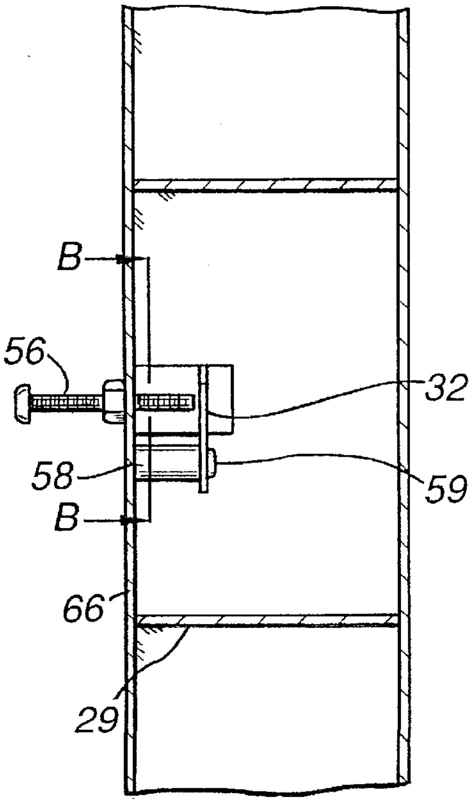
Fig. 12B
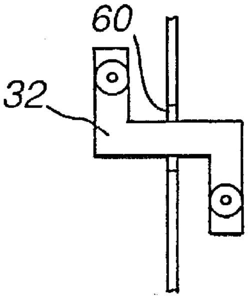
Fig. 12C
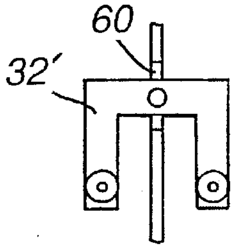
Fig. 12D
Fig. 12

APPARATUS AND METHOD FOR FORMING A HOUSING ASSEMBLY

This application is a continuation of application Ser. No. 08/412,030, filed Mar. 23, 1995, entitled A DIELECTRIC RESONATOR FILTER, and now U.S. Pat No. 5,841,330.

BACKGROUND OF THE INVENTION

1. Field of the Invention

The present invention relates generally to the field of microwave filters. More particularly, the present invention relates to a dielectric resonator filter which can be used in microwave communication systems, for example, in cellular phone base stations, in the personal communication service (PCS) markets, and the like.

2. Discussion of the Related Art

In the microwave communications market, where the microwave frequency spectrum has become severely crowded and has been sub-divided into many different frequency bands, there is an increasing need for microwave filters to divide the microwave signals into these various frequency bands. Accordingly, various waveguide and resonator filters have been employed to perform band pass and band reject functions in order to divide up the frequency spectrum into these different frequency bands.

In the field of microwave dielectric resonator filters, it is known that a bandwidth of such a filter is a function of a resonant frequency of dielectric resonators, within the filter, and respective coupling coefficients between each of the dielectric resonators. Thus, typically to achieve a desired bandwidth, the dielectric resonators are longitudinally spaced, in a cascaded manner, in a waveguide so as to provide desired inter-resonator coupling factors. Since the bandwidth is a function of the inter-resonator coupling factor and the frequency of resonance of the dielectric resonator, varying the spacing between the dielectric resonators results in variations in the bandwidth about the center frequency of operation. Accordingly, the overall filter dimensions, in particular the filter length, typically must be varied in order to meet a center frequency and bandwidth requirement. Therefore, in order to divide the microwave communications band up into the many different frequency bands of operation, a multiplicity of filter dimensions must be employed. However, with advances in technology, increasingly remote locations for base stations where such filters are to be employed, and decreasing size requirements, non-uniform filter dimensions are no longer acceptable.

In addition, in the microwave communications band where such filters are to be employed, it is increasingly becoming a requirement that the filter have a large attenuation factor at a certain frequency from a center frequency of operation of the filter. For example, requirements for attenuation of spurious signals and of signals not in the pass band of the filter are becoming more difficult to meet, thereby requiring an increased complexity in a design of the filter. However, the typical solutions to such requirements such as increasing the number of resonator elements within the filter, can no longer be employed given the reduced size requirements of the filter.

Accordingly, it is an object of the present invention to solve the above-described disadvantages and to provide an improved dielectric resonator filter having one or more of the advantages recited herein.

In particular, the present invention provides a method and an apparatus for providing a dielectric resonator filter with a fixed inter-resonator spacing which can be employed at different center frequencies of operation and for different operating bandwidths.

In addition, the present invention provides an improved dielectric resonator filter which can provide and increase attenuation ratio at a frequency offset from the center frequency, as compared to a dielectric resonator filter having a same number of dielectric resonators.

Further, with the present invention there is provided an improved dielectric resonator filter which can be easily manufactured.

SUMMARY OF THE INVENTION

In one embodiment of the invention, a dielectric resonator filter includes a plurality of dielectric resonators respectively disposed in a plurality of dielectric resonator cavities. The plurality of dielectric resonator cavities are defined by a plurality of walls. For each electrically adjacent dielectric resonator cavity, a coupling device is provided in a common wall, between the electrically adjacent dielectric resonator cavities, for coupling an electromagnetic signal between the adjacent resonator cavities. In addition, a second wall of selected non-adjacent resonator cavities, include a cross-coupling device which provides cross-coupling of the electromagnetic field between respective dielectric resonators of the selected non-adjacent resonator cavities.

With this arrangement, the dielectric resonator filter includes both in-line coupling coefficients and cross-coupling coefficients so that the filter can meet both in-band and out-of-band electrical performance requirements.

In another embodiment of the present invention, a method and an apparatus for providing a bandpass filter that will meet both in-band and out-of-band electrical performance requirements includes providing a first bandpass filter which has a bandwidth substantially the same as the bandwidth requirement of the bandpass filter and also meets the in-band electrical performance requirements. In addition, a second bandpass filter is provided in series with the first bandpass filter. The second bandpass filter has a pass-band broader than the pass-band of the first bandpass filter, an in-band electrical performance that in combination with the in-band performance of the first bandpass filter meets the in-band bandpass filter requirements and an out-of-band electrical performance, when in combination with the out-of-band performance of the first bandpass filter, meets the out-of-band electrical performance requirements of the bandpass filter.

With this arrangement, the series combination of the first bandpass filter and the second bandpass filter meets both the in-band and out-of-band electrical performance requirements for the bandpass filter, which are not achieved with a single bandpass filter.

In still another embodiment of the present invention, a method of providing a dielectric resonator filter with desired in-line coupling, between respective resonators of electrically adjacent resonator cavities, as well as desired cross-coupling, between respective resonators of non-adjacent resonator cavities, is provided. The method includes determining desired values of in-line coupling factors between respective resonators of the electrically adjacent dielectric resonator cavities, as well as determining values of cross-coupling factors between respective resonators of non-adjacent resonator cavities. In addition, a value of $Q_{ex}$ at an input and output port of the filter is determined. The value of $Q_{external}$ is realized at the input port and at the output port by varying one of a diameter of a conductive rod of an input/output coupling device or by varying a length of the conductive rod of the input/output coupling device. Once the value of $Q_{external}$ has been realized, the in-line coupling factors are realized by varying a coupling device between the respective resonators of the electrically adjacent resonator cavities, so that the desired coupling factor between the respective resonators is achieved. In addition, the desired cross-coupling factor, between respective resonators of the non-adjacent dielectric cavities is achieved by varying a cross-coupling device. The step of varying the coupling device or the cross-coupling device is then repeated for each additional resonator, of the plurality of dielectric resonators, for which in-line coupling or cross-coupling is to be provided.

With this arrangement, the dielectric resonator filter is provided with desired in-line coupling factors between respective dielectric resonators of electrically adjacent dielectric resonator cavities and desired cross-coupling reactances between respective dielectric resonators of at least two non-adjacent dielectric resonator cavities.

In yet another embodiment of the present invention, a method of joining a first and a second part together to create an electrical and mechanical bond between the two parts is provided. The method includes fabricating the first part with protrusions along at least one surface of the first part and fabricating the second part with through-holes, situated so as to mate with the protrusions on the first part. The first part and the second part are then brought together such that the protrusions mate with through the through-holes. With the first and second parts pressed tightly together, the protrusions are then peened over such that the protrusions fill the through-holes and form the mechanical and electrical bond between the first and second parts.

The features and advantages of the present invention will be more readily understood and apparent from the following detailed description of the invention, which should be read in conjunction with the accompanying drawings, and from the claims which are appended at the end of the detailed description.

BRIEF DESCRIPTION OF THE DRAWINGS

The foregoing and other objects and advantages of the invention will become more clear with reference to the following detailed description of the drawings, in which like elements have been given like reference characters, and in which:

In the Drawing,

FIG. 12*b*) is a sectional view, taken along cutting-line B—B of FIG. 12*a*), of a coupling mechanism of the present invention;

FIG. 12*c*) discloses an exploded view of an S-shaped loop coupling mechanism of the present invention;

FIG. 12*d*) shows an exploded view of a U-shaped loop coupling mechanism of the present invention;

DETAILED DESCRIPTION

For the purposes of illustration only, exemplary embodiments of the present invention will now be explained with reference to specific dimensions, frequencies, and the like. One skilled in the art will recognize that the present invention is not limited to the specific embodiments disclosed, and can be more generally applied to other circuits and methods having different parameters than those illustrated.

Figure 1:
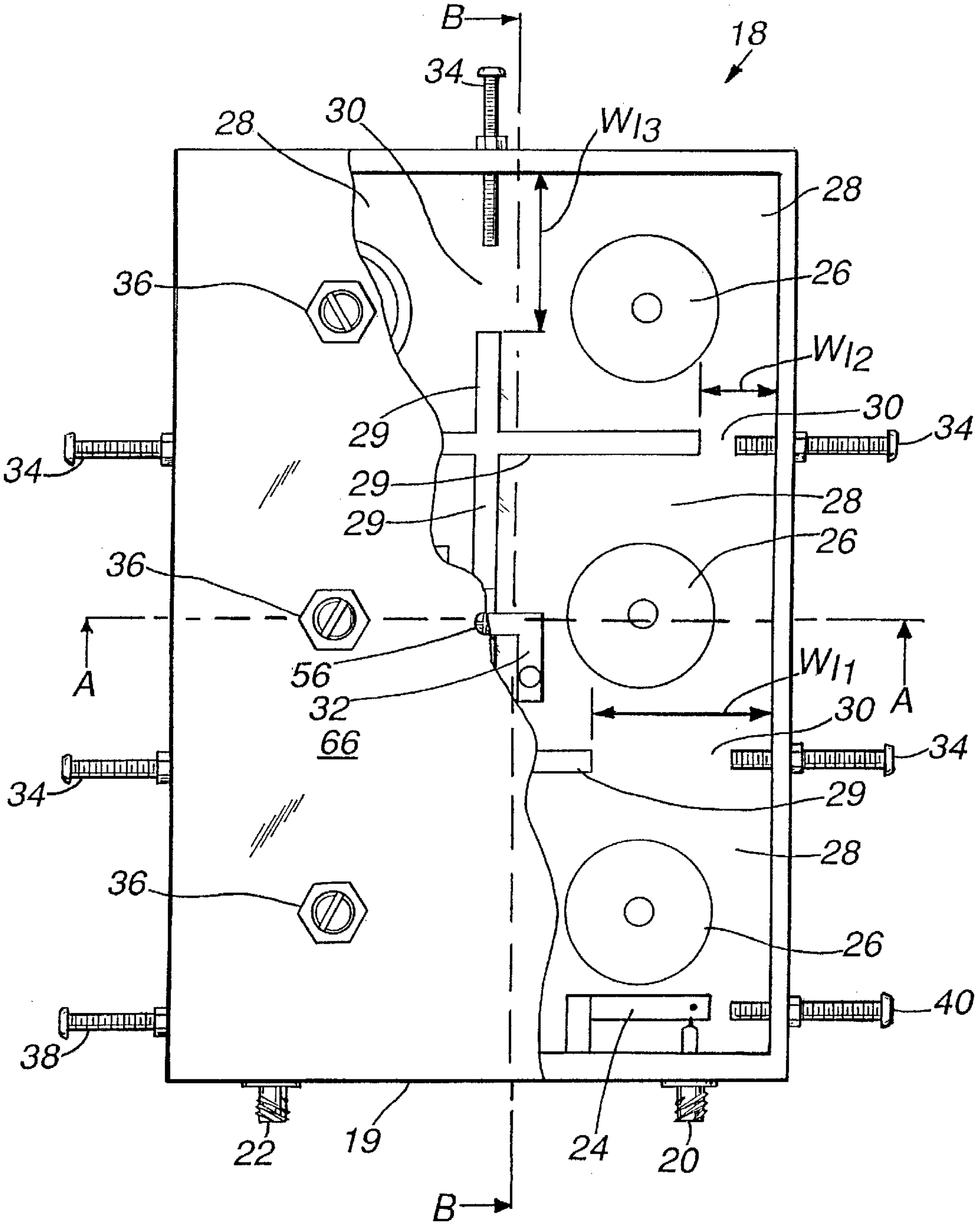
FIG. 1 is a top view of a dielectric resonator filter according to the present invention.

FIG. 1 illustrates a top view of dielectric resonator filter 18 according to the present invention. The dielectric resonator filter 18 has an input port 20 for receiving a signal and an output port 22 for providing a filtered signal. Between the input port 20 and the output port 22, there exists, in-line, a series of adjacent resonant cavities 28, each resonator cavity including a respective dielectric resonator 26.

Ordinarily a dielectric resonator filter is a waveguide of rectangular cross-section provided with a plurality of dielectric resonators that resonate at a center frequency. An electrical response of the filter is altered by varying a proximity of the dielectric resonators with respect to each other so that the resonant energy is coupled from a first resonator to a second resonator, and so on, thereby varying a bandwidth of the filter. In particular, in an evanescent mode waveguide (a waveguide operating below cut-off), the dielectric resonators are usually cascaded at a cross-sectional center line of the rectangular waveguide i.e. at the magnetic field maximum when the dielectric filter operates in a $TE_{01\delta}$ mode (also known as a "magnetic dipole mode"). Since the bandwidth of the filter is a function of the inter-resonator coupling and a frequency of operation of the dielectric resonator, a different spacing between each of the resonators is normally required for a certain bandwidth about a center-frequency.

However, with the present invention, there is no need to vary a spacing between the plurality of dielectric resonators 26. In contrast, according to an embodiment of present invention, each resonant cavity 28 includes a plurality of walls 29, disposed in a housing 19, which form the plurality of resonator cavities 28. The plurality of walls 29, may be partial walls, which extend from a bottom surface of the housing 19 at least partially towards a cover 66, or full walls which extend from the bottom surface of the housing 19 to the cover 66. In addition, in a preferred embodiment of the invention, each resonant cavity 28 includes at least one iris 30 having a respective width $W_I$, which is varied to achieve a desired, in-line, inter-resonator coupling between dielectric resonators 26. In the context of this application, it is to be understood that what is meant by in-line or adjacent resonator cavities is resonator cavities that are electrically connected in series to form a main coupling path through the filter. However, it is to be appreciated, that additional mechanisms for providing the desired coupling, such as probes or loops disposed through a common wall 29, between adjacent resonator cavities are also intended to be covered by the present invention. Additional details of these mechanisms will be discuss infra.

Therefore, the dielectric resonator filter according to the present invention has an advantage in that a length, width and height of the filter 18 can be chosen freely, within certain dimensions, without a need to consider the inter-resonator spacing. Further, a uniform dimensioned filter housing 19 can be utilized and an operating frequency and bandwidth of the filter can be varied without varying the dimensions of the housing 19.

In the preferred embodiment of the filter 18, the width $W_I$ of iris openings 30, between the in-line resonators 26, is set to provide approximately a desired amount of coupling between the resonators 26. Fine tuning of the inter-resonator coupling is achieved, for example, by use of a horizontal coupling tuning screw 34, horizontally disposed so that a distal end of the screw protrudes into the iris 30, or alternatively by means of a horizontal tab 62, as shown in FIG. 12, which can be extended into the iris 30. Additional details of the tuning mechanisms for fine tuning the in-line coupling between respective resonators 26 of adjacent resonator cavities 28, will be given infra. In addition, it is to be appreciated that other mechanisms for fine tuning coupling, such as a vertical tuning screw to be discussed infra, can also be used to fine tune the in-line coupling and are intended to be covered by the present invention.

The dielectric resonator filter 18 also includes an input/output coupling device 24 for coupling the received signal, at input port 20, to a first of the dielectric resonators 26, and the filtered signal, from a last of the dielectric resonators 26, to the output port 22. According to the present invention, a desired external quality factor $Q_{ex}$ at the filter input port 20 and output port 22 is achieved with the input/output coupling device 24. The input/output coupling device 24 can be varied to achieve the desired value of $Q_{ex}$ at the input port 20 and the output port 22. Thus, in the preferred embodiment of the filter 18, by varying the inter-cavity iris width $W_I$ between respective resonator cavities 28 and by varying dimensions of the input/output coupling device 24 to yield a desired value of $Q_{ex}$ at both the input port 20 and the output port 22, a desired filter performance, in the pass band (in-band), can be achieved. In particular, an approximate value of $Q_{ex}$ is provided through the input/output coupling device 24 at the input port 20 and the output port 22. Tuning screws 38 and 40 are then provided to fine tune the value of $Q_{ex}$ at the input port 20 and at the output port 22. Additional details of how the input/output coupling device is varied to achieve an approximate value of $Q_{ex}$ and how the fine tuning of $Q_{ex}$ is achieved, will be discussed infra.

In addition to meeting in-band performance specifications with the dielectric resonator filter 18, the requirements of microwave communications require that the filter 18 have excellent frequency attenuation in a certain frequency range from a center frequency of operation of the filter (i.e. in the stop band of a pass band filter). According to the present invention, a sharper roll off of the stop band frequency response and thus a larger out-of-band attenuation is achieved by providing at least one cross-coupling mechanism 32, of appropriate sign, between respective resonators 26 of non-adjacent, resonator cavities 28 of the filter 18. In the context of this application, what is meant by non-adjacent resonator cavities is a pair of resonator cavities which are not electrically in series, e.g. which have at least one resonator cavity disposed electrically between the pair of resonator cavities. However, it is to be understood that electrically non-adjacent resonator cavities can be physically adjacent to one another.

According to the present invention, the cross-coupling mechanism 32 is provided between at least one pair of resonators 26 in respective, non-adjacent resonator cavities 28. The cross-coupling mechanism 32 produces transmission zeroes in the attenuation region thereby increasing the out-of-band attenuation to greater than that of a predetermined level, at a predetermined frequency from a center frequency, of a filter without such transmission zeroes. It is to be appreciated that as the number of cross-couplings 32, between non-adjacent resonators 26, is increased in an alternating sign manner, the number of finite out-of-band transmission zeroes increase and thus the out-of-band attenuation performance also increases. This is because one or more transmission zeroes on the imaginary axis of the complex plane, provide finite transmission zeroes in the stop band of the filter. It is also to be appreciated that a phase response of the filter can be similarly improved by providing additional cross-coupling mechanisms 32 of the same sign. This is because one or more transmission zeroes on either the real axis of the complex plane or in the complex plane, improve the phase response of the filter. Thus, as the number of cross-coupling mechanism 32 is increased, any combination of transmission zeroes in the complex plane, can be provided.

According to the preferred embodiment of the present invention, the coupling mechanism 32 provides approximately the cross-coupling factor desired between non-adjacent resonators 26. In addition, a vertical tuning screw 56, as shown in FIG. 12*b*), provides a fine tuning of the cross coupling between the non-adjacent resonators 26. Additional details of various embodiments of the coupling mechanism 32 and of the fine tuning screw 56 will be discussed infra.

Figure 14:
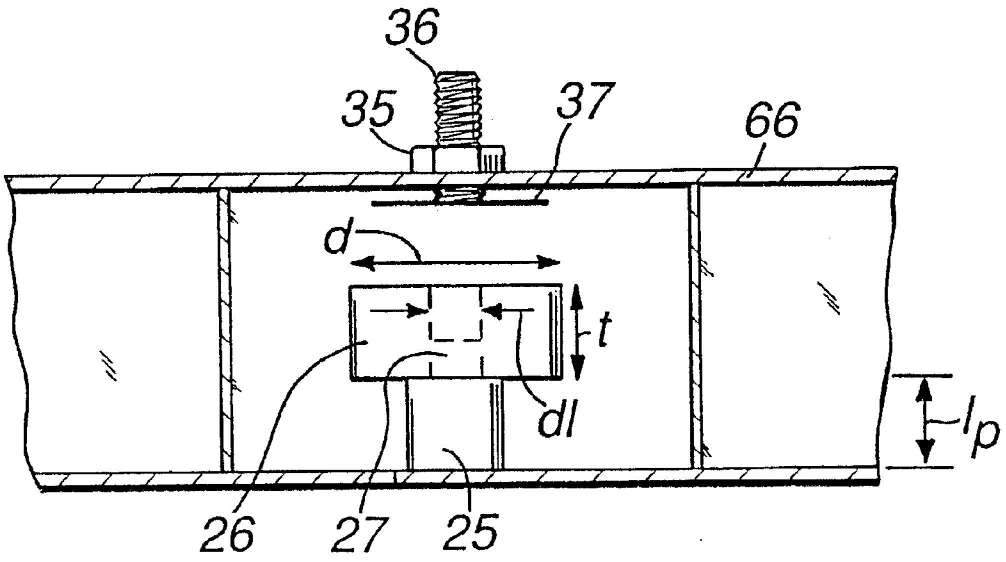
FIG. 14 shows a sectional view, taken along cutting line B—B of FIG. 1, of an apparatus for tuning a frequency of operation of the dielectric resonators of the filter of FIG. 1.

According to the present invention, the dielectric resonating filter 18 also includes a plurality of center frequency tuning screws 36, respectively disposed above each of the plurality of dielectric resonators 26. Each of the tuning screws is rotatively mounted in the cover 66 of the dielectric filter apparatus 18. Referring to FIG. 14, each of the tuning screws 36 has a conductive plate 37 at a distal end of the tuning screw 36, which is disposed above the dielectric resonator 26. Additional details of the center frequency tuning screw 36 and the conductive plate 37, will be discussed infra.

In the preferred embodiment of the dielectric resonator filter 18, the filter includes six resonator cavities 28 and respective dielectric resonators 26, disposed in a 2×3 matrix arrangement as shown in FIG. 1. The dielectric resonator filter 18 is symmetrical in that a first iris width $W_{I1}$ between a first resonator and a second resonator as well as between a fifth resonator and a sixth resonator is 1.4 inches; a second iris width $W_{I2}$ between the second resonator and a third resonator as well as between a fourth resonator and the fifth resonator of 0.9 inches; and a third iris opening $W_{I3}$ between the third resonator and the fourth resonator is 1.35 inches. In addition, an in-band performance of the dielectric resonator filter 18 is less than 0.65 dB of insertion loss over a 4 MHz pass band centered at 1.9675 GHz. Further, the filter has an out-of-band attenuation performance of >16 dB at frequencies >3.5 MHz from 1.9675 GHz. Further the filter fits into a housing 19 having a width of 5 inches, a length of 7.5 inches and a height 1.8 inches. However, it is to be appreciated that these dimensions and the electrical characteristics are by way of illustration only and that any modification, which can be made by one of ordinary skill in the art, are intended to be covered by the present invention.

Figure 2:
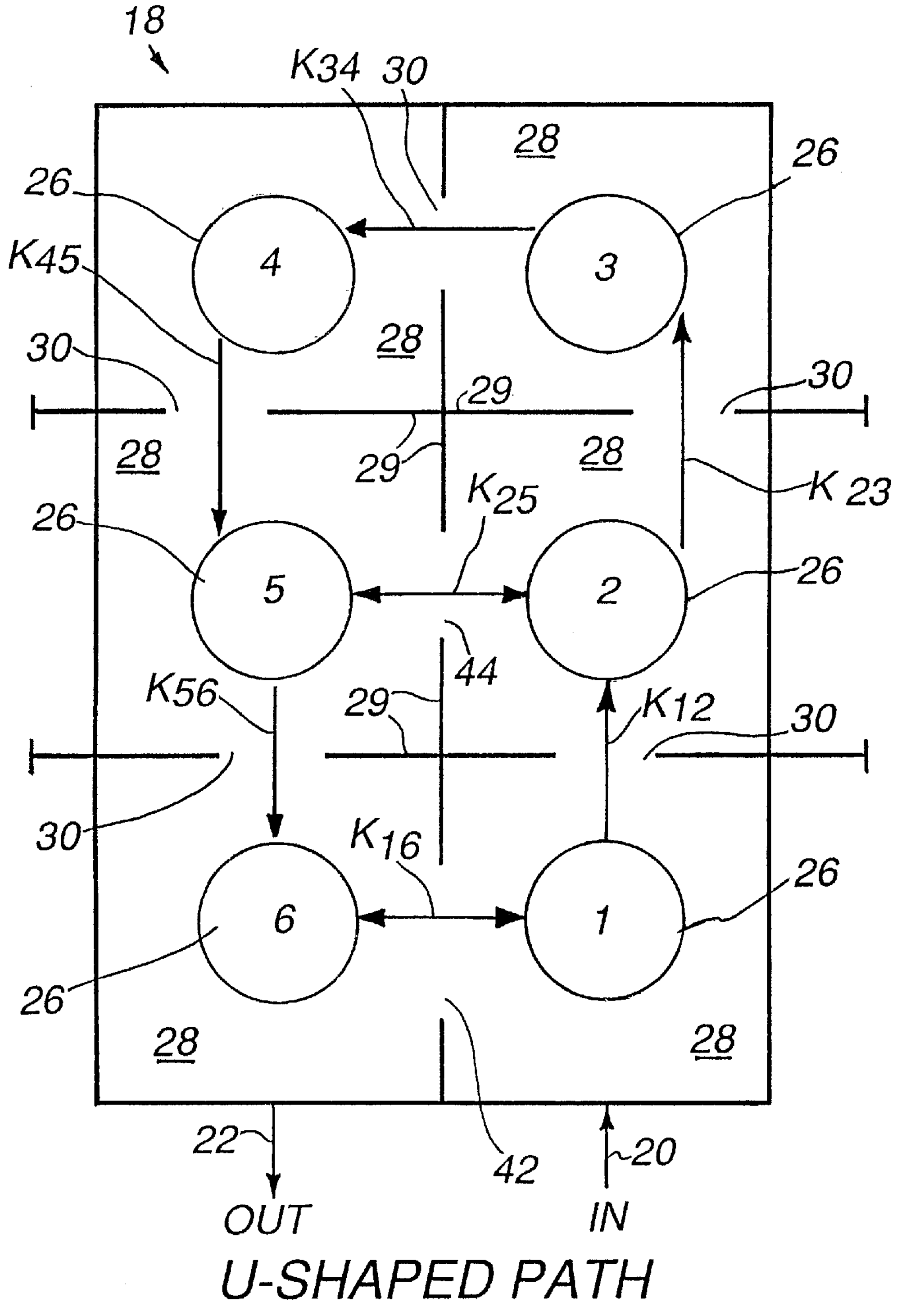
FIG. 2 illustrates an in-line coupling path between a plurality of dielectric resonators of the filter of FIG. 1, according to one embodiment of the present invention.

FIG. 2 illustrates an in-line coupling path between the plurality of dielectric resonators 26 of the filter 18, according to one embodiment of the present invention. According to this embodiment, there are six dielectric resonator cavities 28, including respective dielectric resonators 26 and iris 30, in a common wall 29 between the adjacent, in-line, resonator cavities 28, which provide a U-shaped, in-line, energy path from the input port 20 to the output port 22.

Figure 4:
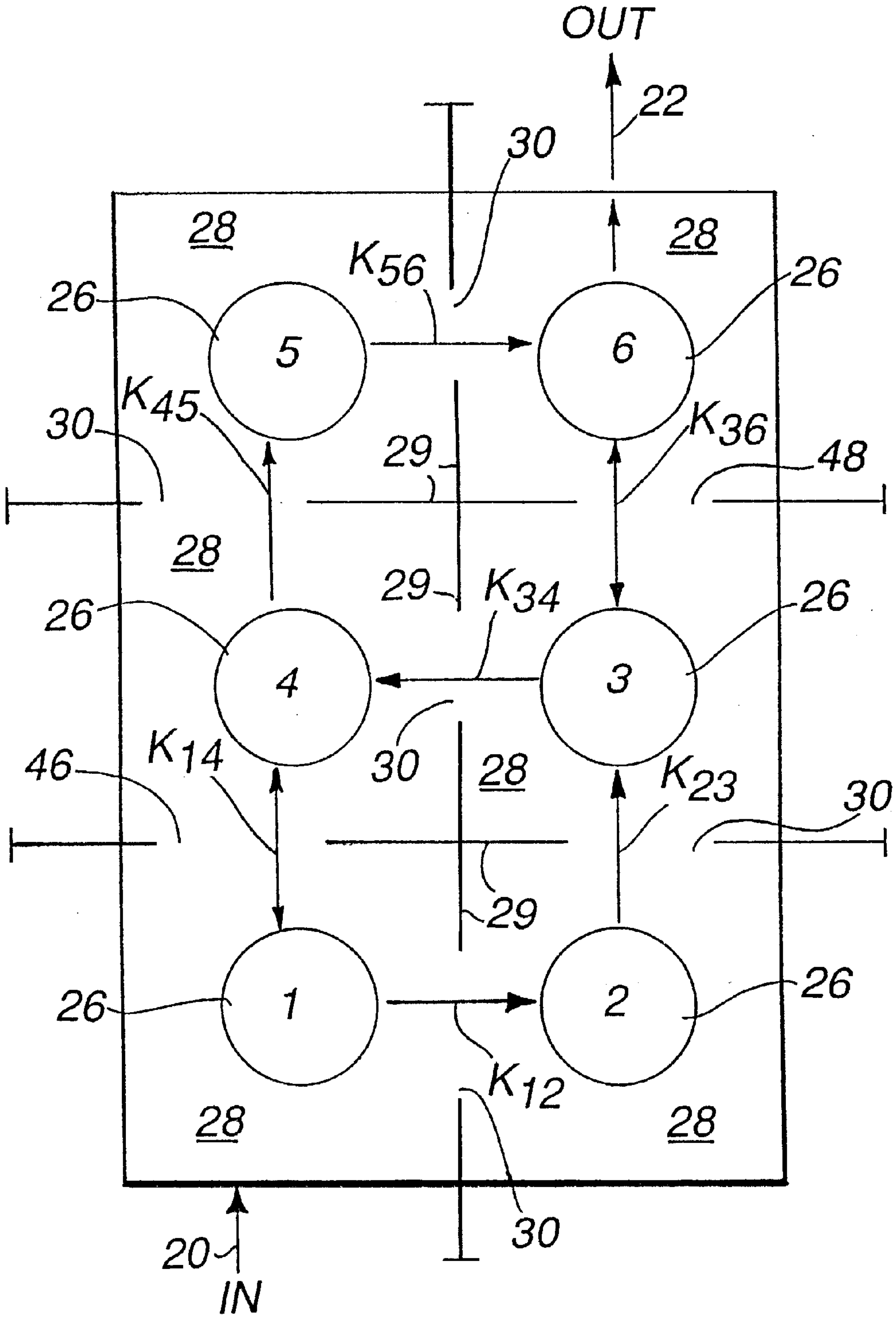
FIG. 4 illustrates an in-line coupling path between the plurality of dielectric resonators of the filter of FIG. 1, according to another embodiment of the present invention.

FIG. 4 illustrates another embodiment of the in-line coupling path according to the present invention, wherein the six resonator cavities 28, including respective dielectric resonators 26 and iris 30 between adjacent resonator cavities, provide a meandered-shaped path from the input port 20 to the output port 22. Thus, according to the present invention, the plurality of resonators 26 and the plurality of iris 30 may be configured to provide a U- or meandered-shaped in-line coupling path between the input port 20 and the output port 22. Thus, the filter 18 can be adapted to a housing dimension 19 which is available. Further, it is to be appreciated that while six resonators 26 are illustrated in the embodiments of FIG. 2 and FIG. 4, a total number of resonators can be increased or decreased and such modifications and other modifications readily known to those skilled in the art, are intended to be within the scope of the invention.

Figure 3:
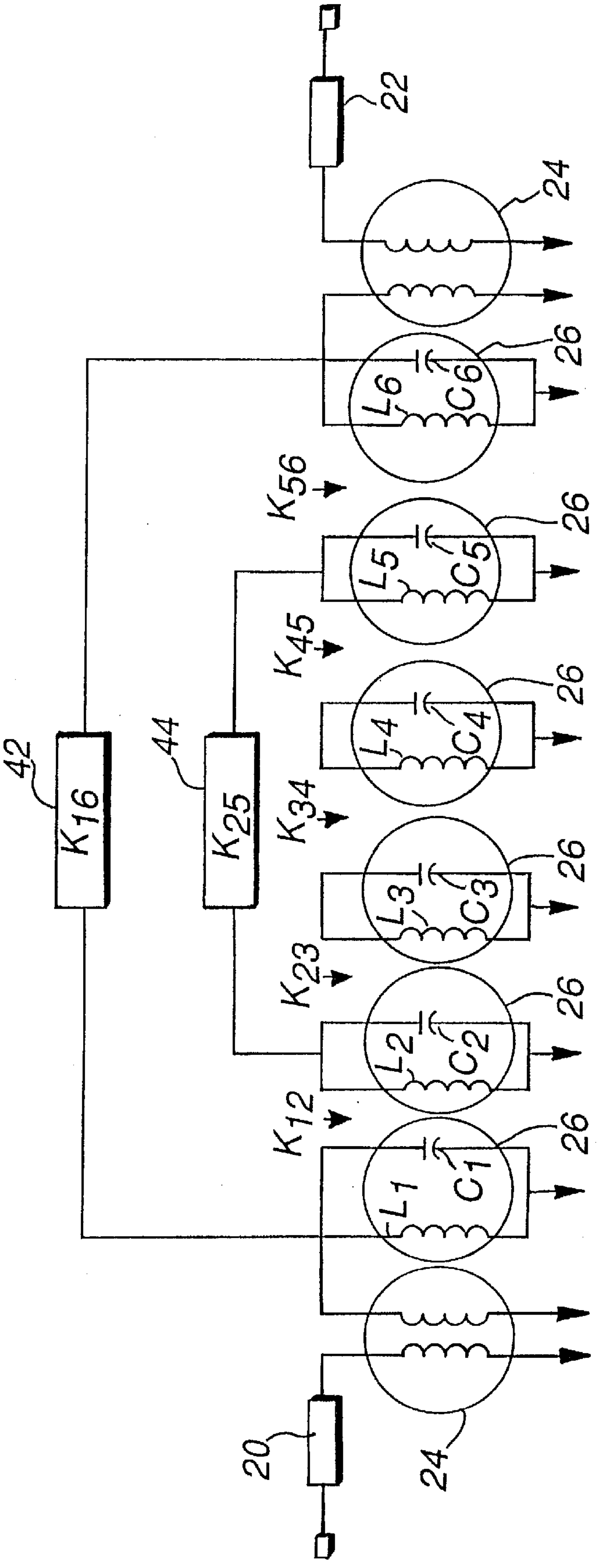
FIG. 3 is an equivalent schematic diagram of the embodiment of the filter as shown in FIG. 2.

Referring now to FIG. 3, there is disclosed an equivalent schematic circuit diagram of the dielectric resonator filter 18 of FIG. 2. In FIG. 3, a coupling factor between the plurality of resonators 26 is indicated by Kij, where i, and j represent a number of a respective dielectric resonator 26. Thus, adjacent (in-line) resonators have a coupling factor with i and j in succession (e.g. $K_{12}$). Whereas, non-adjacent resonators have a cross coupling factor where i and j are not in succession (e.g. $K_{16}$). As discussed above, the cross-coupling factor $K_{25}$ between dielectric resonators 2 and 5 can have either a positive or a negative sign. Similarly the cross-coupling factor $K_{16}$, between elements 1 and 6, can have either a positive or a negative sign. In a preferred embodiment of the filter 18, the coupling factor $K_{25}$ has a negative sign while the coupling factor $K_{16}$ has a positive sign, so that the filter 18 has two transmission zeroes. Additional details as to how a positive or negative coupling factor is provided, according to the present invention, will be discussed infra.

Figure 5:
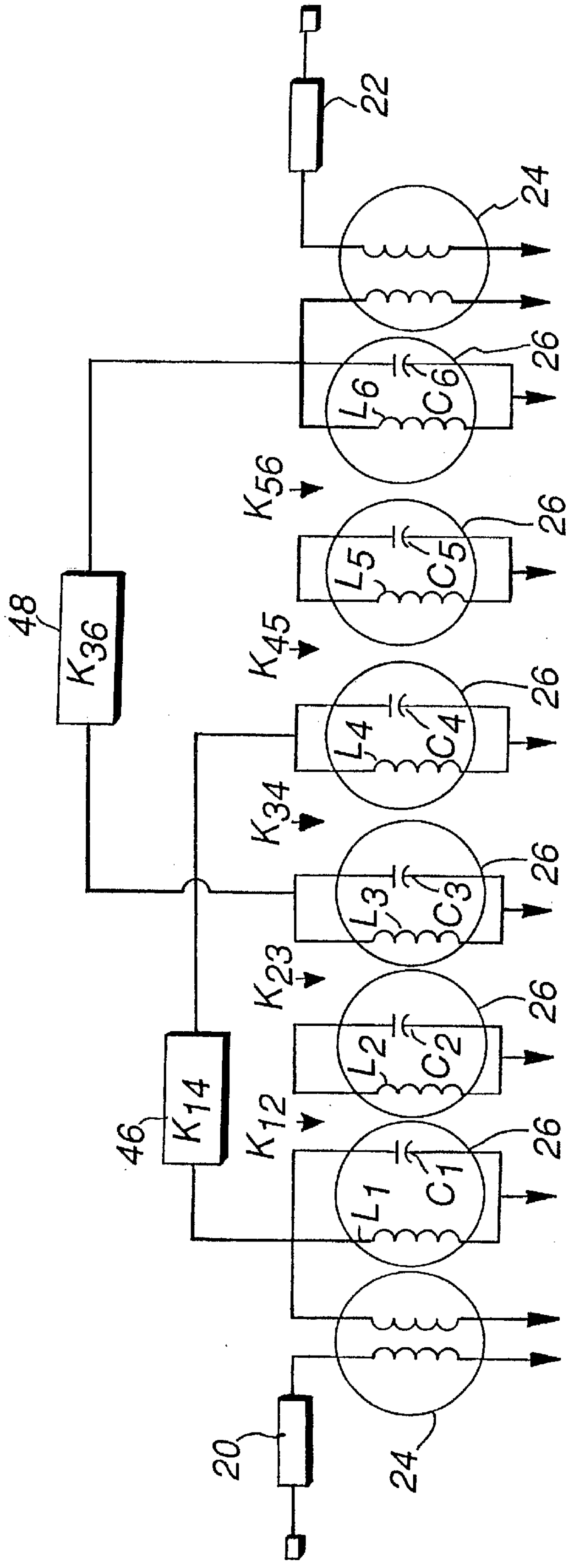
FIG. 5 is an equivalent schematic diagram of the embodiment of the filter as shown in FIG. 4.

Referring now to FIG. 5, there is disclosed an equivalent schematic circuit diagram of the embodiment of the dielectric resonator filter 18, as shown in FIG. 4. In this embodiment the coupling factors $K_{14}$ and $K_{36}$ can have either a positive or negative sign. In the preferred embodiment of the filter 18, according to this configuration, the cross-coupling factor $K_{14}$, between non-adjacent resonators 1 and 4, and the cross-coupling factor $K_{36}$, between non-adjacent resonators 3 and 6, are both negative, so that the filter 18 has two transmission zeroes.

In the preferred embodiment of the filter 18, as shown in FIG. 1, the U-shaped path between the input port 20 and the output port 22, as shown in FIG. 2, is used because the electrical performance of the filter 18, in the stop band, with cross-coupling factors $+K_{16}$ and $-K_{25}$, is better than an out-of-band performance with cross-coupling factors $-K_{14}$ and $-K_{36}$ of the meandered-path embodiment of FIGS. 4–5. However, it is to be appreciated that the out-of-band performance with a single reactance $-K_{25}$, between the second and fifth resonators, of the U-shaped path embodiment of FIGS. 2–3 can be achieved with both coupling factors $-K_{14}$ and $-K_{36}$ of the meandered-path embodiment of FIGS. 4–5. It is also to be appreciated that either one of the embodiments as shown in FIGS. 2–5, as well as any modifications known to those skilled in the art, are intended to be covered by the present invention.

A method of designing and constructing the dielectric resonator filter 18, according to the present invention, will now be described. First, a desired center frequency, a desired operating bandwidth (for example as dictated by the division of the microwave communications spectrum), a desired filter complexity and a desired return loss at the input 20 and output 22 ports, are decided upon. These parameters are used to calculate a value of $Q_{ex}$, for the input port 20 and the output port 22, and the plurality of the inter-resonator coupling coefficients $K_{ij}$, for a given number of dielectric resonators to be used. The values of $Q_{ex}$ and $K_{ij}$ can be derived, for example, using a computer. For example, Wenzel/Erlinger Associates of Agoura Hills, Calif. 30423 Canwood Street, Suite 129 provides a commercially available software program for IBM or IBM compatible computers and MS-DOS based PCs, under the name "Filter VII-CCD," which provide the values of $Q_{ex}$ and the coupling coefficients $K_{ij}$ between each of the dielectric resonators. The input parameters to the program are a lower pass-band edge frequency, an upper pass-band edge frequency, and one of a desired return loss, a desired input and output VSWR, or a desired pass band ripple (in dB). The user also inputs a desired number of transmission zeroes at DC, and the transmission zero locations on the real axis and in the complex plane.

Figure 6:
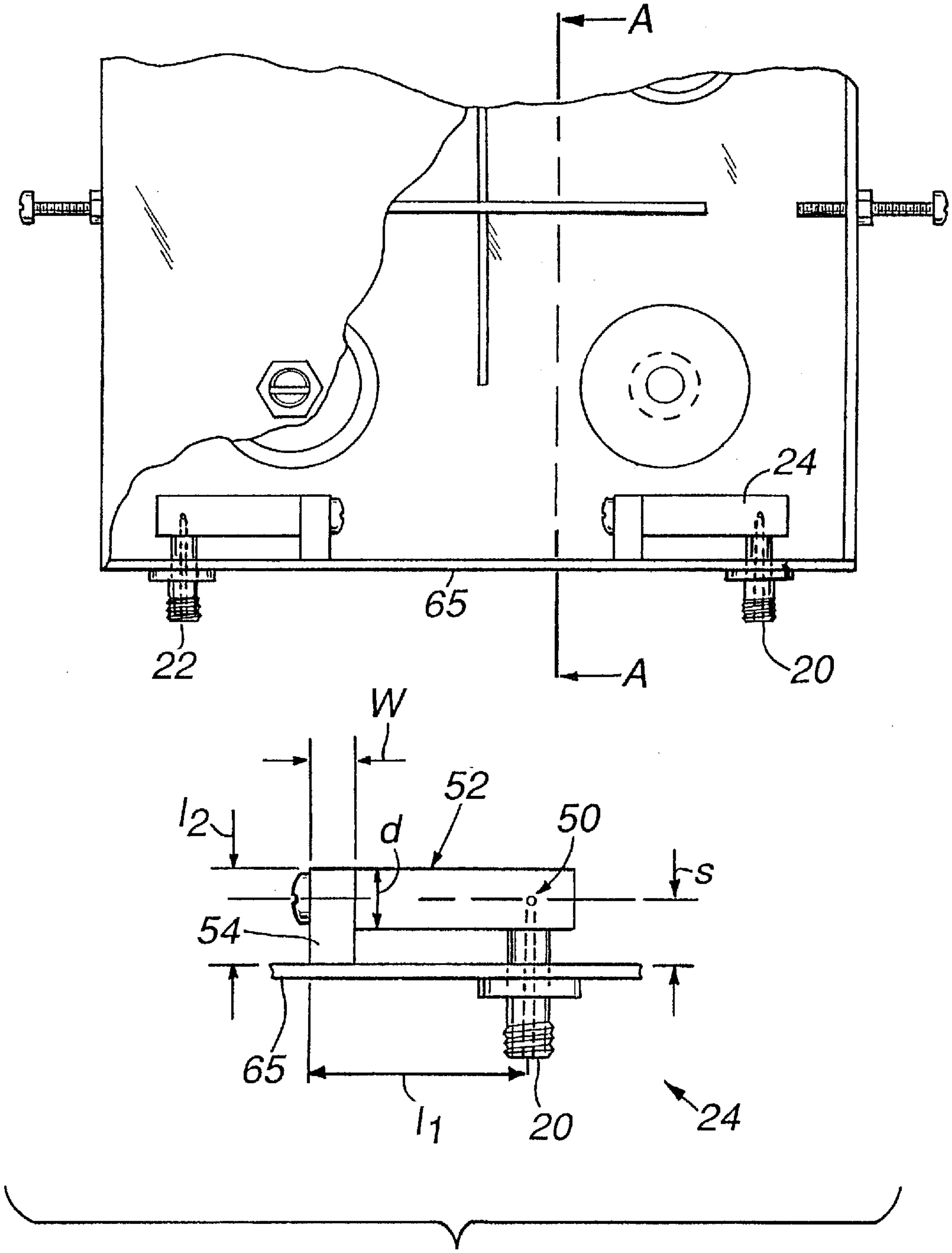
FIG. 6 is an exploded view of a first embodiment of the input/output coupling device of the dielectric resonator filter of FIG. 1.

Given the coupling factors $K_{ij}$ and the value of $Q_{ex}$, the input/output coupling device 24 is chosen to approximately achieve the value of $Q_{ex}$. Referring to FIG. 6, there is shown an exploded view of the input/output coupling device 24. The input/output coupling device 24 includes a conductive rod 52 having a diameter d. A proximate end of the conductive rod 52 is connected to the input port 20 or the output connector 22 at solder point 50. A center of the conductive rod 52 is spaced, at a spacing s, from an inside of a sidewall 65 of the housing 19. In a preferred embodiment, the conductive rod has an electrical length $l_1$ which can be varied by moving a conductive spacer 54 along the length of the conductive rod 52 to vary the effective wavelength of the conductive rod 52. The conductive spacer 54 has a width w and a length $l_2$, and shorts a distal end of the conductive rod 52 to the sidewall 65 of the housing 19. In addition, the value of $Q_{ex}$ can also be varied by varying the diameter d of the conductive rod 52 while maintaining a fixed location of the conductive spacer 54 and thus a fixed electrical length $l_1$ of the conductive rod. It is also to be appreciated that alternative methods of achieving $Q_{ex}$, are also intended to be covered by the present invention.

Figure 7:
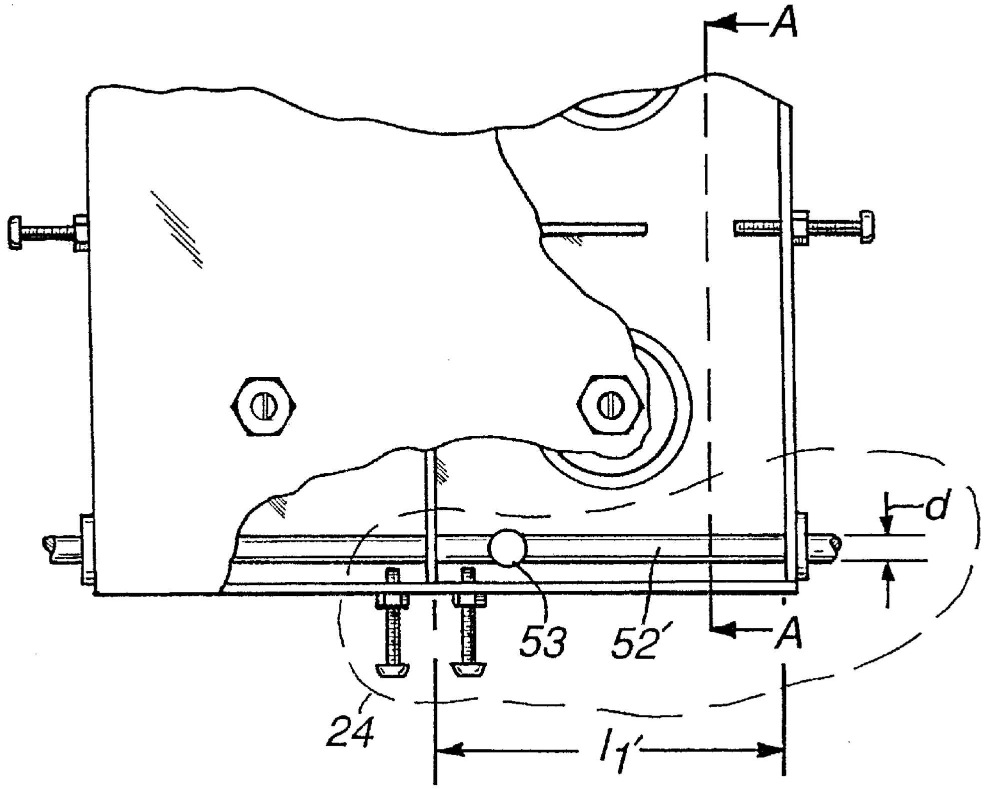
FIG. 7 is an exploded view of a second embodiment of the input/output coupling device of the dielectric resonator filter of FIG. 1.

For example, referring now to FIG. 7 the conductive rod 52' can be an open-circuited rod instead of a short-circuited conductive rod 52. For the open-circuited rod 52', the distal end of the rod is not shorted to the sidewall 65 of the housing 19, but instead is an open-circuit. The distal end of the conductive rod 52' is supported by a dielectric spacer 53. The length 11' of the rod 52' is physically varied to achieve the desired value of $Q_{ex}$ Alternatively, a diameter d' of the open-circuited rod 52' is varied, while maintaining a fixed length of the open-circuited rod 52', to achieve $Q_{ex}$. Therefore, according to the present invention, the value of $Q_{ex}$ can be varied by changing one of the first embodiment and the second embodiment of the input/output coupling device 24 as described above. In addition, it is to be appreciated that modifications, readily known to one of ordinary skill in the art, are intended to be covered by the present invention.

In the preferred embodiment of the filter 18, a short-circuited rod 52 is used where s=0.325 inches, d=0.29 inches, $l_1$=1.050 inches, w=0.20 inches, and $l_2$=0.470 inches.

Referring now to FIG. 1, as discussed above, in the preferred embodiment of the invention tuning screws 38 and 40 are provided for fine tuning of the value of $Q_{ex}$. As shown in FIG. 1, the tuning screws are rotatively mounted, horizontally in a sidewall, such that an axial length of the screws are parallel to a length of the conductive rod 52. The tuning screw is rotated so that a proximity of a distal end of the tuning screw is varied with respect to the conductive rod 52. The tuning screw tunes the value of $Q_{ex}$ by adding capacity in parallel with shunt inductance formed by the shorted rod, to bring the resonant frequency of the parallel combination closer to the operating frequency. As the resonant frequency of the parallel combination is moved closer to the operating frequency, the current is increased thereby creating a stronger magnetic field to couple to the first resonator. Therefore, the value of $Q_{ex}$ can be fine tuned. It is to be appreciated that the tuning screws 38 and 40, as disclosed in FIG. 1, are not so limited and that various alterations and modifications by one of ordinary skill in the art are intended to be covered by the present invention. For example, the tuning screw may be mounted in the same sidewall 65 of the housing 19, which also holds the input and output connectors 22, so that the axial length of the tuning screw is perpendicular to the length of the conductive rod 52.

In the preferred embodiment of the filter 18, once the value of $Q_{ex}$ is obtained, a width $W_I$ of a first iris 30 can be slowly increased to achieve the desired coupling factor $K_{12}$ between, for example, the first and the second dielectric resonators 26. In particular, the width $W_I$ of the iris is slowly varied until a desired insertion loss response (which reflects a desired coupling factor) is measured between the respective dielectric resonators 26 of the first and the second dielectric resonator cavities 28. The procedure for measuring the insertion loss, between the dielectric resonators, is readily known to those of ordinary skill in the art. The coupling factor $K_{12}$ should be measured with the coupling tuning screw 34 in a number of positions. In particular, a first measurement should be made with a distal end of the coupling tuning screw 34 flush with the sidewall of the housing 19. The coupling factor should then increase (and thus the value of insertion loss should decrease) as additional measurements are made with the distal end of the coupling screw penetrating into the iris opening 30 at various distances. This is because the primary mode of coupling between the resonators is a magnetic coupling mode. Thus, as the distal end of the coupling screw 34 penetrates further into the iris 30, there should be increased inductive coupling between the resonators.

Figure 8:
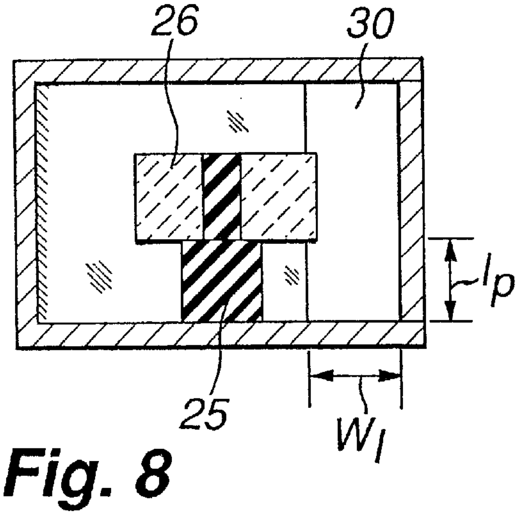
FIG. 8 is a sectional view of a single dielectric resonator cavity, taken along cutting line A—A of FIG. 1, which discloses a first embodiment of an iris for coupling electromagnetic signals between adjacent dielectric resonator cavities.

FIG. 8 illustrates a sectional view of a resonator cavity 28, taken along line A—A of FIG. 1, including resonator 26 and iris 30, having width $W_I$, for coupling the electromagnetic field of resonator 26 to another resonator 26 in a physically adjacent resonator cavity. The dielectric resonator 26 is mounted on a low-dielectric constant pedestal 25 having a length $l_p$.

Figure 9:
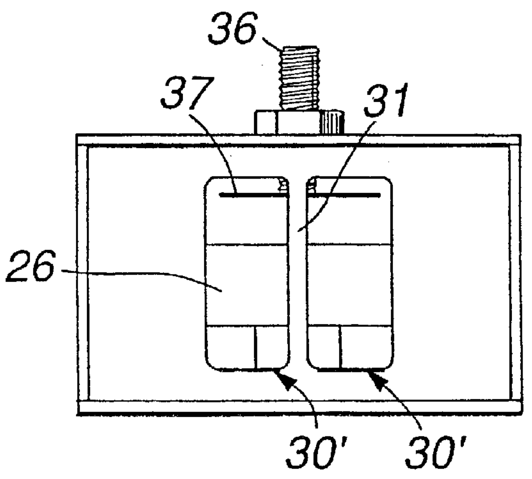
FIG. 9 is a sectional view of a single dielectric resonator cavity, taken along cutting line A—A of FIG. 1, which discloses a second embodiment of an iris for coupling electromagnetic signals between adjacent dielectric resonator cavities.

FIG. 9 illustrates the sectional view of the resonator cavity 28, takes along line A—A of FIG. 1, showing, an alternative embodiment of the iris 30' which couples the electromagnetic field from resonator 26 to another resonator 26 in the physically adjacent resonator cavity. The iris 30' includes a high-order mode suppression bar 31 which is substantially centered in a middle of the iris width $W_I$. The suppression bar 31 has a width $w_b$ which is sufficient to suppress higher-order, waveguide modes yet does not affect the inter-resonator coupling factor of the magnetic dipole mode between the resonators 26. It is to be appreciated that the iris 30 and the iris 30' can be used to provide both in-line coupling between adjacent resonators and cross-coupling between non-adjacent resonators. In addition, while specific examples of iris configuration have been given for providing inter-resonator coupling factors $K_{ij}$ between respective resonators 26, various alterations and modifications of such iris, readily known to one of ordinary skill in the art, are intended to be within the scope of the present invention.

Figure 10:
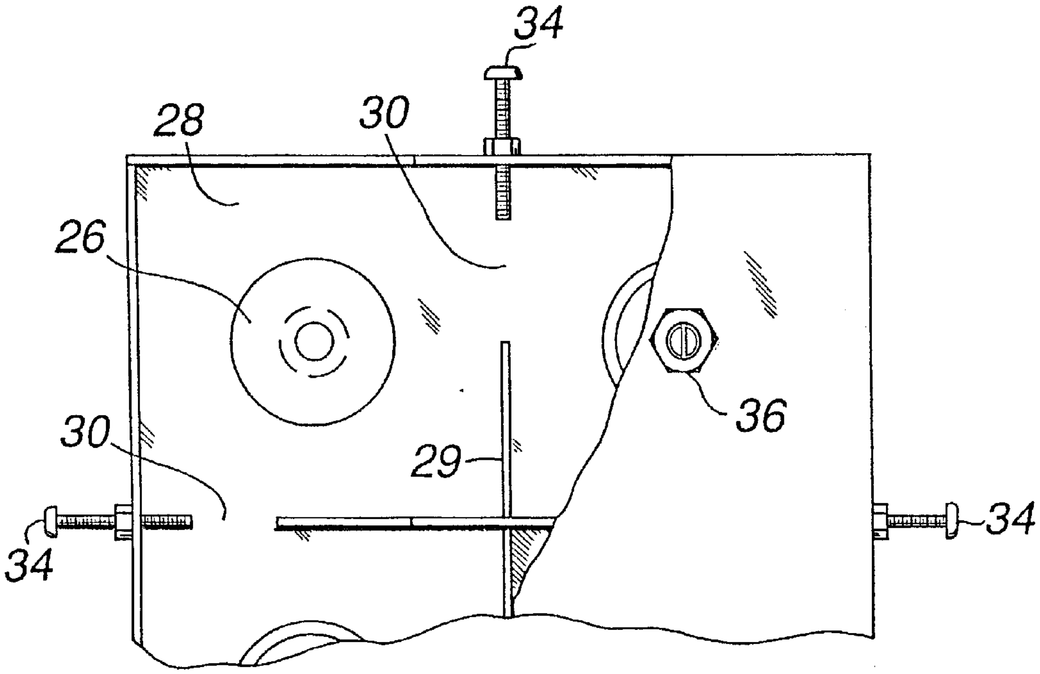
FIG. 10 is a top view of the dielectric resonator filter of FIG. 1, illustrating a first embodiment of an apparatus for fine tuning coupling between respective resonators of adjacent resonator cavities.
Figure 11:
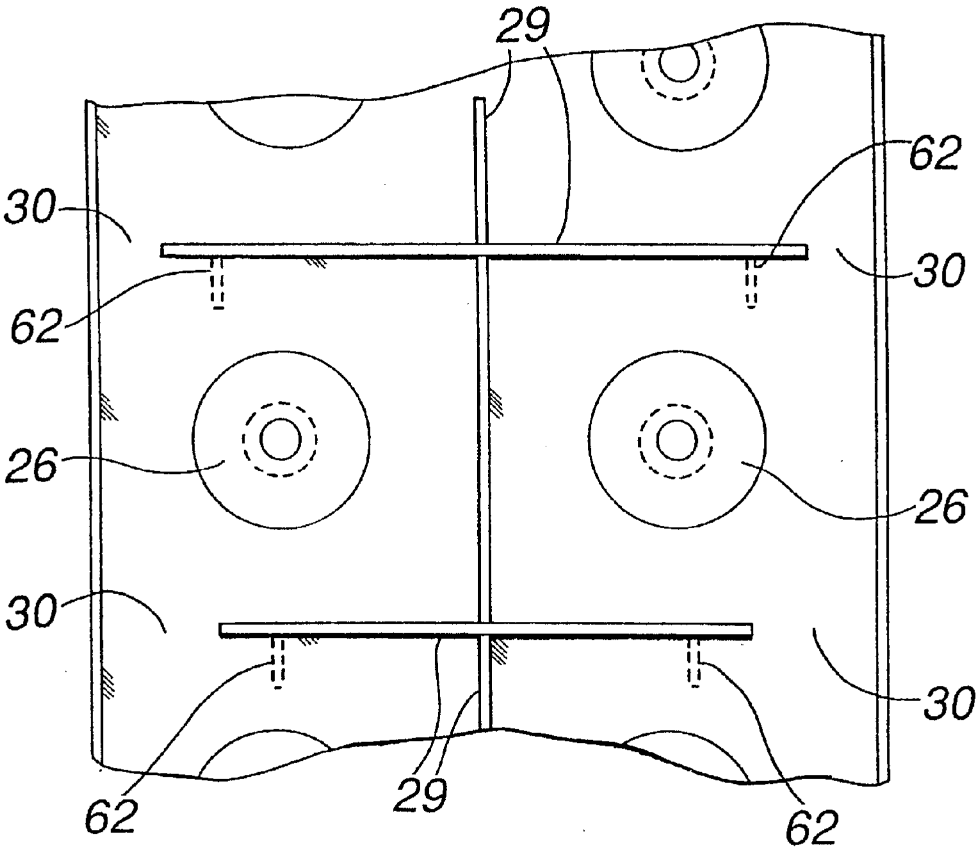
FIG. 11 is a top view of the dielectric resonator filter of FIG. 1, illustrating a second embodiment of an apparatus for fine tuning the coupling between respective resonators of adjacent resonator cavities.

Referring now to FIGS. 10–11, there is shown a top view of alternate embodiments of mechanisms for fine tuning of the inter-resonator coupling factor $K_{ij}$ between respective resonators 26 of both adjacent and non-adjacent resonator cavities 28. In the preferred embodiment of the filter 18, these mechanism are used to fine tune the in-line coupling between respective resonators of adjacent resonator cavities.

In particular, FIG. 10 illustrates a horizontal tuning screw 34, rotatively mounted in the sidewalls of the base 19 of the filter 18. Each coupling factor tuning screw 34 is respectively disposed so that a distal end of the tuning screw extends into a respective iris 30 between adjacent resonator cavities 28. As discussed above, the primary mode of coupling between the resonators 26 of adjacent resonator cavities 28, is the magnetic coupling mode. Thus, as a penetration of the distal end of the coupling screw is increased into the iris, there is an increase in the inductive coupling between the respective resonators. Thus the coupling tuning screw 34 can be used to increase the coupling between the dielectric resonators to be greater than that which is achieved with the iris alone.

Alternatively, referring to FIG. 11, there is shown a plurality of tabs 62 which are pivotally mounted to an end of a cavity wall 29 forming one end of the iris 30 between respective adjacent resonators cavities 28. In a preferred embodiment, each of the plurality of tabs is approximately centered with respect a height of the dielectric resonator 26 and is a fraction of the height of the cavity 28. Each of the plurality of tabs 62 can be pivoted between a first and a second position. In a first position, an axial length of the tab is perpendicular to the cavity wall 29 such that the iris width $W_I$ is maintained. In this position the tab provides no additional magnetic coupling between adjacent resonators. In a second position, the tab 62 is pivoted into the iris 30 such that the width $W_I$ is decreased. In the second position, the tab provides increased inductive coupling between respective resonators 26 of the adjacent resonator cavities 28. Thus, according to the preferred embodiment of the filter 18, the iris 30 is used to provide an approximate coupling factor $K_{ij}$ between the respective resonators, and either a horizontal tuning screw 34 or a tab 62 if provided to provide increased coupling between the respective dielectric resonators 26. Although several embodiments have been shown for tuning of the coupling factor $K_{ij}$ between both adjacent and non-adjacent resonator cavities 28, it is to be appreciated that various alterations or modifications readily achievable by one of ordinary skill in the art, are intended to covered by the present invention.

Figure 13:
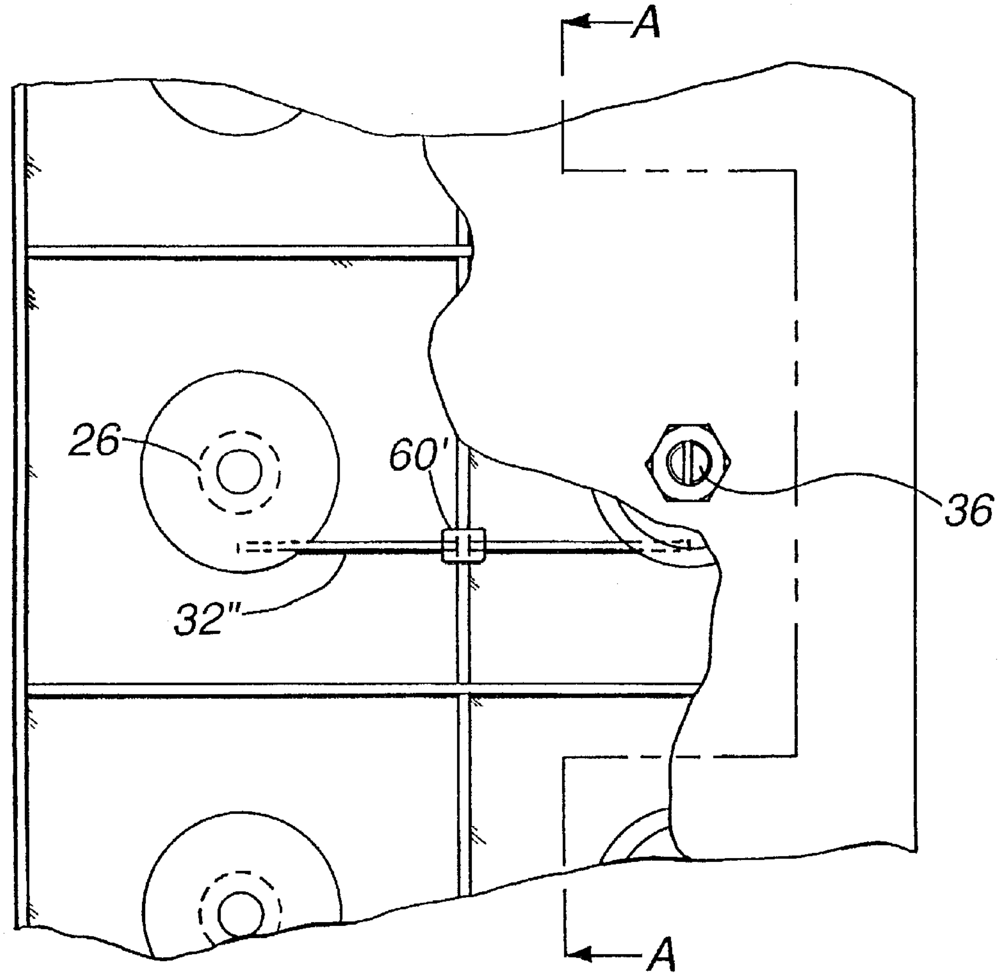
FIG. 13 shows a top view of a capacitive probe coupling mechanism according to the present invention.

After the desired coupling factor between the first and the second dielectric resonators has been achieved, a desired cross-coupling factor $K_{ij}$ is achieved. As discussed, above, the cross-coupling factor $K_{ij}$ can either be positive or negative, and depends, for example, upon the particular configuration chosen. Referring to FIGS. 12–13, there are shown an exploded view of a plurality of devices for achieving the cross-coupling factor $K_{ij}$. FIG. 12*b*) shows a sectional view, taken along cutting line B—B of the top view of the Filter of FIG. 12*a*), of the coupling mechanism 32 and tuning screw 56. The coupling mechanism 32, is shorted to the cover 66, through the threaded conductive spacer 58 by screw 59. However, it is to be appreciated that any known fastening device is intended to be covered by the present invention. Further, various alterations and modifications such as, for example, shorting coupling mechanism 32 to a cavity wall 29 to provide better spurious response, are intended to be covered by the present invention.

FIG. 12*c*) discloses an S-shaped loop 32, situated in an iris 60, between respective resonators of non-adjacent resonator cavities 28. Using the right hand turn rule of electromagnetic field propagation, one can ascertain that the S-shaped loop provides a negative coupling $-K_{ij}$ between the non-adjacent resonators. Alternatively, a U-shaped loop 32', as shown in FIG. 12*d*), disposed in the iris 60 between non-adjacent resonators 26, is used to provide a positive coupling factor $+K_{ij}$ between non-adjacent resonators 26. Although it is disclosed that the S-shaped 32 and U-shaped 32' loop are provided between non-adjacent resonators to provide cross-coupling factors, it is to be appreciated that the S- and U-shaped loops can also be disposed between adjacent, resonators to provide in-line coupling factors. More specifically the S-shaped loop 32 or the U-shaped loop 32' can be used instead of an iris 30 to provide coupling between adjacent resonators.

FIG. 13 further shows a top view of an additional mechanism for providing cross-coupling, which is a capacitive probe 32" mounted in the iris 60' between the respective resonators 26 of the non-adjacent resonator cavities 28. The capacitive probe 32" also provides a negative coupling factor $-K_{ij}$ between the non-adjacent resonators 26, and therefore can be substituted for the S-shaped loop of FIG. 11*c*). In addition, the capacitive probe can also be used to provide in-line coupling between respective resonators of adjacent resonator cavities. It is to be appreciated that although several embodiments have been shown for providing the cross the coupling factor $K_{ij}$ between respective resonators of both adjacent and non-adjacent resonator cavities, various modifications and alterations readily known to one of ordinary skill in the art are also intended to be covered by the scope of the present invention. For example, a floating loop, having either an oval shape or a FIG. 8 shape, suspended by a dielectric and disposed in an iris between adjacent or non-adjacent resonator cavities, can also be used to provide the coupling factor $K_{ij}$. The oval-shaped and FIG. 8 shaped loops can be used to provide positive and negative coupling, respectively. In addition, various other modifications, known to one of ordinary skill in the art, such as shorting the U-shaped loop and the S-shaped loop to a sidewall to achieve improved spurious response, are also intended to be covered by the present invention.

As discussed above, the S-shaped loop 32, the U-shaped loop 32', or the capacitive probe 32" provide approximately the desired coupling factor $K_{ij}$ between the respective resonators 26 of either adjacent or non-adjacent resonator cavities 28. Referring now to FIG. 12*b*), the vertical coupling tuning screw 56 is vertically disposed above the coupling mechanism 32 to finely tune the coupling between the respective resonators. The vertical coupling tuning screw 56 is mounted in the cover 66, of the dielectric resonator filter, such that a proximity of a distal end of the screw can be varied with respect to the coupling mechanism 32. The vertical coupling tuning screw 56 provides a capacitance to ground. Thus, the vertical coupling tuning screw 56 decreases coupling between respective resonators coupled together by the capacitive probe 32", and increases coupling between the resonators coupled together by either the U-shaped loop 32' or the S-shaped loop 32.

According to one embodiment of the invention, once the cross-coupling factor between the adjacent resonators and the coupling factor between the non-adjacent resonators have been achieved, these steps can be repeated as the number of resonators in the dielectric resonator filter 18, is increased.

Alternatively, using a test fixture, a catalog of $Q_{ex}$ versus a varying dimension of the input/output coupling device 24, is created. In example, a graph is created of $Q_{ex}$ as a function of varying a length of l1 of the conductive rod 52 or a graph is created of $Q_{ex}$ as a function of varying the diameter d of the conductive rod 52. Using the same test fixture, a catalog of the coupling coefficient $K_{ij}$ is created as a function of a varying dimension of one of the coupling devices. For example, a graph of the coupling coefficient as a function of the width $W_I$ of the iris 30, or of the coupling coefficient as a function of a dimension of the S-shaped loop 32, and the like, is created. Using the catalogs, the dimensions of the filter 18 can then be chosen, given the output of the calculations discussed above.

Referring now to FIG. 14 there is shown a sectional view, taken along cutting line B—B of FIG. 1, of the dielectric resonator 26, which is mounted on a low-dielectric pedestal 25, of the center frequency tuning screw 36 and of the conductive plate 37. The dielectric resonator 26 is manufactured to have a certain mass, as defined by a diameter d and a thickness t of the resonator 26, minus a mass of the hole 27, having diameter $d_h$ and thickness t, so that the resonator will resonate at approximately a desired frequency range. In addition, the dielectric resonator 26 is made of a base ceramic material having a desired dielectric constant (∈) and a desired conductivity (σ). The resonator frequency of the dielectric resonator is also a function of ∈, while the Q of resonator is a function of the σ (e.g. the lower the σ, the higher the Q).

In one embodiment of the present invention, a base material of the dielectric resonator 26 is a high Q ZrSnTiO ceramic material having a dielectric constant ∈ of 37. This base material is doped with a first dopant Ta in a range between 50 and 1,000 parts per million (ppm). More specifically, in the preferred embodiment, 215 ppm of Ta is used as the first dopant. In addition, the base material is also doped with a second dopant Sb also in a range between 50 and 1,000 ppm. More specifically, in the preferred embodiment, 165 ppm of Sb is used as the second dopant. In addition, in the preferred embodiment of the dielectric resonators 26, the diameter of the resonator is 29 mm, the thickness is 1.15 mm, and the diameter of the hole $d_h$ is 7 mm. The mixture of Ta and Sb are used to reduce the amount of Ta used, since Sb is less expensive than Ta. In addition, when adding Sb to the composition of ZrSnTiQ and Ta, an advantage and surprising result is that less than a mol for mol substitution of Sb for Ta is required in order to achieve optimum performance of the dielectric resonator 26. Further, an advantage of this combination of ceramic material and dopants is that, as an operating temperature is varied, the operating frequency of the resonator 26 shifts equally in a direction opposite to that of a frequency shift due to the coefficient of thermal expansion of the housing 19. Therefore, the resonator 26 is optimized to yield a temperature stable filter 18. It is to be appreciated that although various dimensions and materials have been disclosed for the dielectric resonator, various alterations and modifications readily a to one of ordinary skill in the art, are intended to be covered by the present invention.

Figure 15:
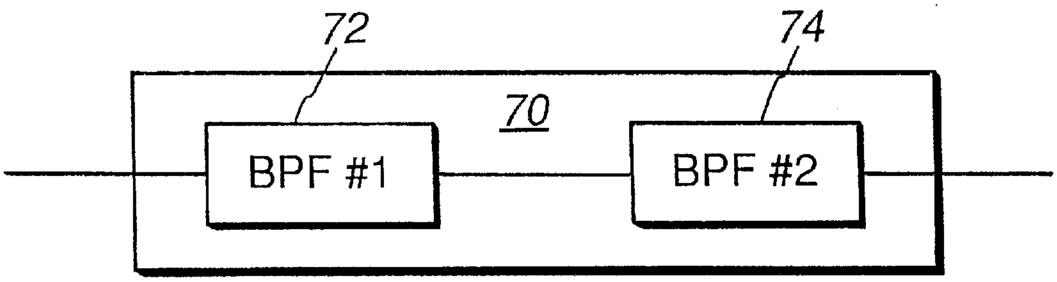
FIG. 15 is a block diagram of a bandpass filter of the present invention, which meets both in-band and out-of-band electrical performance requirements.

Referring now to FIG. 15, which is a block diagram of a band pass filter 70, according to the present invention, which will meet both in-band and out-of-band electrical performance requirements. For example, as discussed above with respect to PCS, the in-band electrical requirements are for the overall filter to have less than 1.2 dB insertion loss, greater than 12 dB of return loss as well as high attenuation characteristics out-of-band. For example, in the preferred embodiment, the PCS requirements are greater than 93 dB of attenuation for signals at frequencies greater than 77.5 MHz from the upper and lower edges of the pass band. Accordingly, with the present invention, a first bandpass filter 72 provides the desired pass-band of the filter 70 and also meets the in-band performance requirements. Also,.a second bandpass filter 74, having a bandwidth greater than the bandwidth of the first bandpass filter 72, provides additional out-of-band attenuation in the stop band of the overall filter 70. Thus, the combination of bandpass filters 72 and 74, in series, provide both the in-band and out-of-band electrical requirements that are not necessarily achievable with a single bandpass filter 72.

Figure 16:
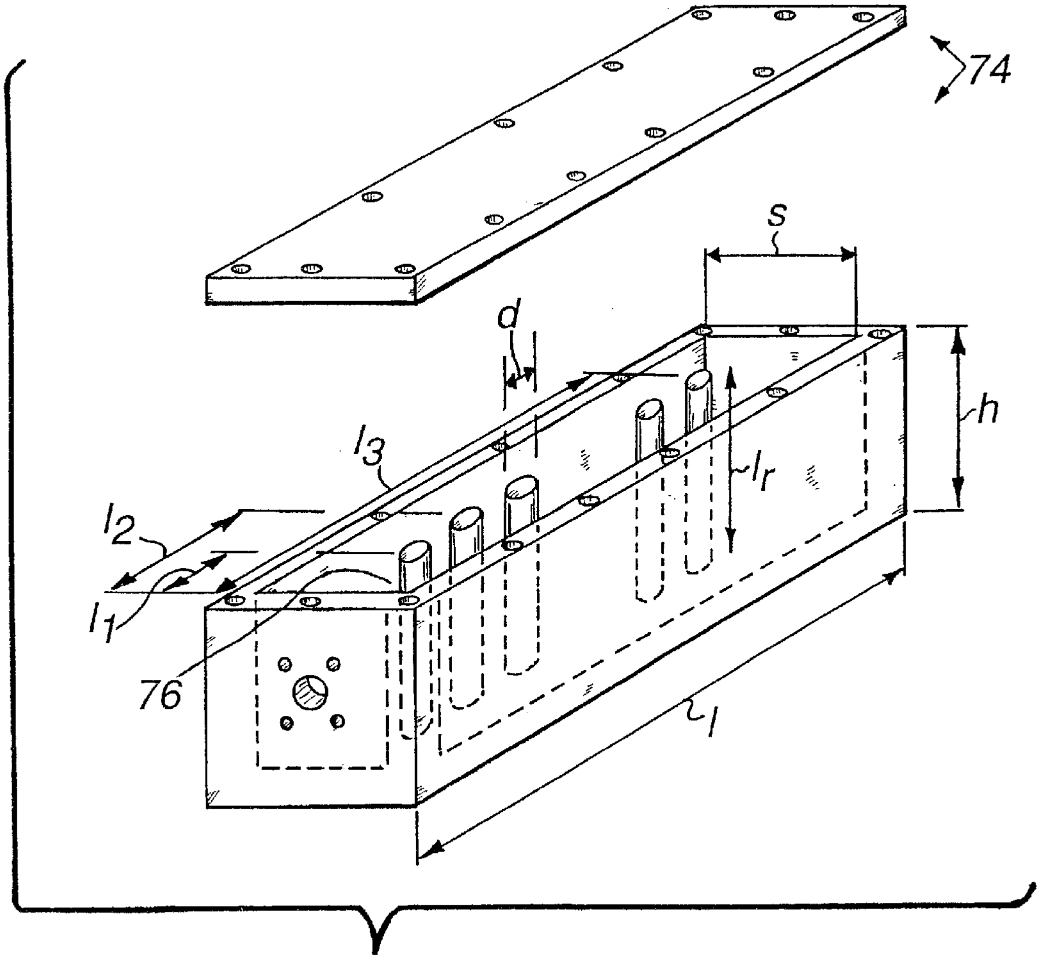
FIG. 16 is a perspective view of a comb-line filter of the present invention.

FIG. 16 is a perspective view of the comb-line filter 74, which includes a plurality of resonators having equal diameter conductive rods 76, having a diameter d and a length $l_r$ centered between parallel ground planes, which are spaced by a spacing s. In addition, the comb-line filter has an overall length l which must be less than 90° in the pass-band of the comb-line filter. The comb-line filter is chosen because a very small insertion loss can be provided in the pass-band while a steep out-of-band rejection ratio can be provided in the stop band over a broad frequency range, which can be added to the rejection ratio of the first bandpass filter 72 to meet the out-of-band electrical requirements of the filter 70.

In a preferred embodiment of the comb-line filter 74, the comb-line filter has a pass-band from 1.875 GHz to 2.065 GHz; resonator locations l1=0.7875 inches, l2=1.7072inches, l3=2.8553 inches, l44.0509 inches, l5=5.2563 inches l6=6.4519 inches, l7=7.6 inches and l8=8.5198 inches; ground plain spacing s=1.25 inches; resonator diameters of d=0.375 inches; and each resonator has a length of $l_r$=1.06 inches.

In a preferred embodiment of the filter 70, the first bandpass filter 72 is the dielectric resonator filter 18 as discussed above. In particular, the dielectric resonator filter 72 provides a 4 MHz pass-band centered at 1967.5 MHz and has an insertion loss of less than 0.8 dB. In addition, in the preferred embodiment, the second bandpass filter 74 is a comb-line filter such as that shown in FIG. 15. The comb-line filter 74 provides a 190 MHz pass-band centered at 1970 MHz has an insertion loss of 0.15 dB, and has an attenuation of ≧93 dB at frequencies ≧1890 MHz. In the frequency range from 2045 MHz to 2200 MHz the ceramic filter 72 and the comb-line filter 74 combine to provide ≧93 dB of the attenuation. Thus the combination of the dielectric resonator filter 72 and the comb-line filter 74 has an insertion loss of ≦0.8 dB and an attenuation of >93 dB at frequencies ≦1890 MHz and ≧2045 MHz.

Figure 17:
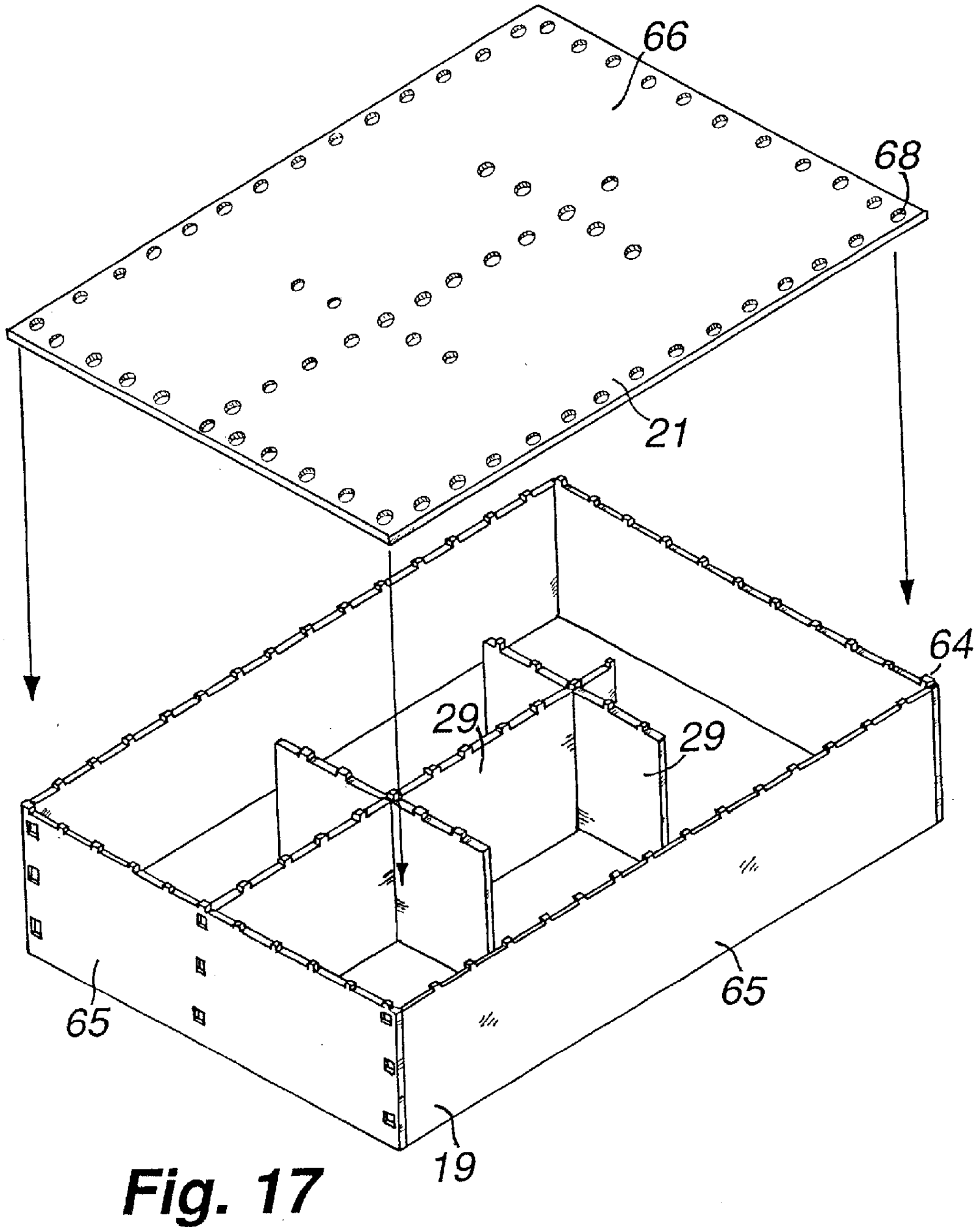
FIG. 17 is a perspective view of a plurality of protrusions and a plurality of through-holes for electrically and mechanically joining a housing and a cover of the filter of FIG. 1.

Referring now to FIG. 17, there is shown a perspective view of the housing 19 and the cover 66 of the filter 18 of FIG. 1, in which there is provided a plurality of protrusions 64 and a plurality of through-holes 68 for providing a strong electrical and mechanical seal between the housing 19 and the cover 66. In particular, the plurality of protrusions 64 and through-holes 68 provide a method and apparatus for joining the dielectric resonator filter housing 19 and the cover 66 to provide a sealed dielectric resonator filter 18 having both good electrical shielding properties and strong mechanical properties. In particular, in the PCS and cellular applications where filters are intended to be used in remote locations, with poor climatic conditions, it is particularly important that the dielectric resonator filter 18 maintain good electrical sealing and good mechanical stability. More specifically, any loose or incomplete contact between the base material 19 and the cover 66 may destroy the dielectric resonator filter performance by increasing filter insertion loss, reducing stop-band rejection, or creating inter-modulation products.

Accordingly, according to the preferred embodiment of the present invention, the side walls 65 of the housing 19 are constructed with the plurality of protrusions 64 along at least one surface of each of the sidewalls 65 and along at least one surface of each of the cavity walls 29 disposed within the base 19. The cover is provided with the corresponding through-holes 68 to align with the protrusions 64. Although it is disclosed, in FIG. 17 that the through-holes are circular and the protrusions are square, it is to be appreciated however that the present invention is not intended to be so limited. In particular, the protrusions and the through-holes may be any combination of round, square, hexagonal, polygonal and the like. Further, any alterations or modifications to the protrusions or through holes, readily known by one of ordinary skill in the art, are intended to be covered by the present invention.

The base 19 and the cover 66 are then brought into alignment. The base 19 and the cover 66 are permanently aligned by peening each protrusion 64 over to fill the corresponding through-hole 68. In the peening process, the cover is pressed tightly to the wall, to form a tight bond that is electrically and mechanically sealed. In a preferred embodiment of the invention, a break-away side of the cover, in particular a bottom side of the cover when the through-holes 66 are punched through a top of the cover, is intended to be facing up. Thus, the top side of the cover, when the holes are punched through the cover, is intended to be bonded to the sidewall 65 of the base material 19. The protrusions are then peened over with a high velocity, low mass force on the protrusion itself so that the protrusion expands into the through-hole. In particular, the top of the protrusion 64 flattens into the through-hole 68 thereby pulling the cover 66 tightly against the base 19.

Figure 18A:
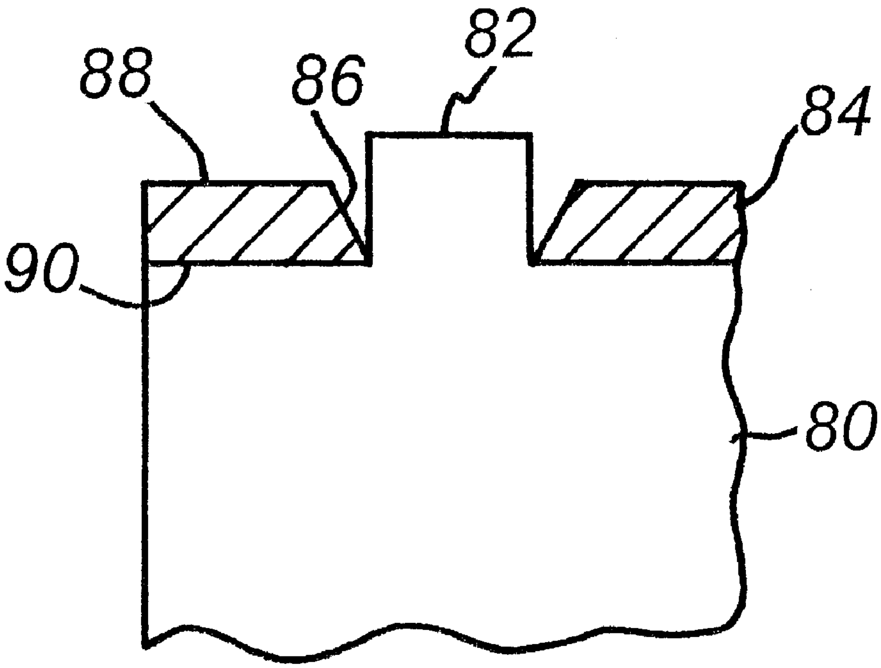
FIG. 18*a* is a detailed cross-sectional view of a first part and a second part of the joining assembly of the invention, prior to being peened together.
Figure 18B:
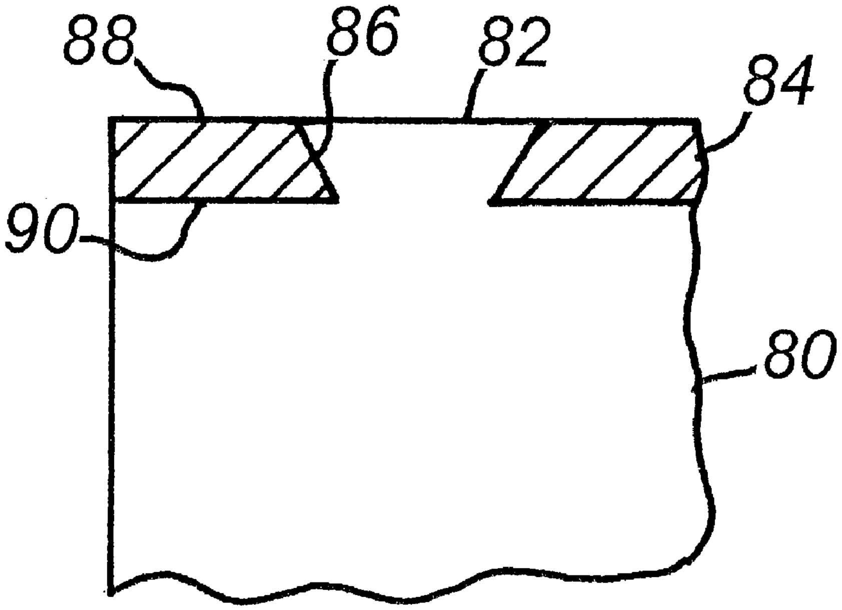
FIG. 18*b* is a detailed cross-sectional view of the first part and the second part of the joining assembly, after being peened together.

Referring to FIGS. 18*a*–38*b*, there is illustrated a cross-sectional view of a first part 80 of an assembly illustrated with a protrusion 82, and a second part 84 of the assembly having a through-hole 86, that are mated together. In FIG. 18*a*, the protrusion is illustrated prior to peening and in FIG. 18*b*, the first part and second part are illustrated as affixed together after the protrusion has been peened. As illustrated in FIG. 18*b*, the through-hole is preferably provided as larger on a first side 88 of the second part than a second side 90 of the second part so that the first and second parts are pulled tightly together as the protrusion is peened to fill the through-hole.

In the preferred embodiment, the base material 19 and the cover 66 are made of sheet steel. In addition, the round holes are punched through the cover 66 and the protrusions are punched or milled in the at least one surface of the base 19 and the cavity walls 29. However, it is to be appreciated that various alterations and modifications of the materials and the manufacturing process are intended to be covered by the present invention. In particular, the through-holes can also be drilled through the cover. In addition, other materials such as aluminum are also intended to be covered by the present invention.

Having thus described several particular embodiments of the invention, various alterations, modifications and improvements will readily occur to those skilled in the art. Such alterations, modifications and improvements are intended to be part of this disclosure are intended to be within the spirit and scope of the invention. Accordingly, the foregoing description is by way of example only and it is limited only as defined in the following claims and equivalents thereto.

What is claimed is:

1. A method of fabricating and joining a first part and a second part, comprising the steps of:

fabricating the first part with a plurality of protrusions spaced along at least one surface of the first part;

fabricating the second part with a plurality of through-holes aligned to mate with corresponding protrusions of the first part;

joining the first part and the second part together by mating the plurality of through-holes of the second part with the corresponding protrusions of the first part; and peening the plurality of protrusions to fill the plurality of through-holes and to join the first part to the second part.

2. The method of claim 1, wherein the step of peening the plurality of protrusions includes maintaining a tight bond between the first part and the second part so that the first part and the second part are firmly joined together.

3. The method of claim 1, wherein the step of providing the plurality of protrusions includes fabricating a length of each of the plurality of protrusions to be long enough to fit through the through-holes and to be peened within the through-holes without an excess of metal.

4. A method of fabricating and joining a first part and a second part, comprising the steps of:

fabricating the first part with a plurality of protrusions spaced along at least one surface of the first part;

fabricating the second part with a plurality of through-holes aligned to mate with corresponding protrusions of the first part;

joining the first part and the second part together by mating the plurality of through-holes of the second part with the plurality of protrusions of the first part;

peening the plurality of protrusions to fill the plurality of through-holes and to join the first part to the second part; and wherein the step of fabricating the second part with the plurality of through-holes includes punching the through-holes through the second part so that at least one of the through-holes, on a first side of the second part, is larger than the corresponding through-hole on a second side of the second part.

5. The method of claim 4, wherein the step of joining the first part and the second part includes abutting the second side of the second part with the first part.

6. The method of claim 4, wherein the step of peening the plurality protrusions includes maintaining a tight bond between the first part and the second part so that the first part and the second part are firmly joined together.

7. The method of claim 4, wherein the step of providing the plurality protrusions includes fabricating a length of each of the plurality of protrusions to be long enough to fit through the corresponding through-holes and to be peened within the corresponding through-holes without an excess of metal.

8. The method of claim 4, wherein the step of peening the plurality of protrusions further comprises mechanically reshaping the plurality of protrusions by orbital riveting.

9. The method of claim 4, wherein the step of manufacturing the second part also includes forming the second part with protrusions to mate with through-holes in a third part.

10. The method of claim 4, wherein the step of manufacturing the first part also includes forming the first part with through-holes to mate with protrusions of a third part.

11. An assembly, comprising:

a first part with a plurality of protrusions spaced along at least one surface of the first part;

a second part with a plurality of through-holes aligned to mate with corresponding protrusions of the first part; and wherein the first part and the second part are joined together such that the plurality of protrusions fill the corresponding through-holes and such that the plurality of protrusions are peened within the plurality of through-holes to form a secure bond between the first part and the second part.

12. The assembly as claimed in claim 11, wherein each of the plurality of protrusions has a length sufficient to fit through the corresponding through-hole and to be peened within the corresponding through-hole without an excess of material.

13. The assembly as claimed in claim 11, wherein the first part and the second part are made of sheet steel.

14. The assembly as claimed in claim 11, wherein the first part and the second part are made of aluminum.

15. An assembly, comprising:

a first part with a plurality of protrusions spaced along at least one surface of the first part;

a second part with a plurality of through-holes aligned to mate with corresponding protrusions of the first part;

wherein the first part and the second part are joined together such that the plurality of protrusions fill the corresponding through-holes and such that the plurality of protrusions are peened within the plurality of through-holes to form a secure bond between the first part and the second part; and wherein a diameter of each of the plurality of through-holes is larger on a first surface of the second part than a diameter of each through-hole on a second surface of the second part and wherein the second surface of the second part is abutting the first part.

16. The assembly as claimed in claim 15, wherein each of the plurality of protrusions has a length sufficient to fit through the corresponding through-hole and to be peened within the corresponding through-hole without an excess of material.

17. The assembly as claimed in claim 15, wherein the first part is a base of a Radio Frequency (RF) housing, the at least one surface is a top of a wall of the base of the RF housing, and the second part is a cover of the RF housing.

18. The assembly as claimed in claim 15, wherein the first part and the second part are made of sheet steel.

19. The assembly as claimed in claim 15, wherein the first part and the second part are made of aluminum.

20. The assembly of claim 15, wherein the protrusions have been peened by orbital riveting.

21. An assembly, comprising:

a first part with a plurality of protrusions spaced along at least one surface of the first part;

a second part with a plurality of through-holes aligned to mate with corresponding protrusions of the first part;

wherein the first part and the second part are joined together such that the plurality of protrusions fill the corresponding through-holes and such that the plurality of protrusions are peened within the corresponding through-holes to form a secure bond between the first part and the second part; and wherein the first part is a base of a Radio Frequency (RF) housing, the at least one surface is a top of a wall of the base of the RF housing, and the second part is a cover of the RF housing.

22. The assembly as claimed in claim 21, wherein each of the plurality of protrusions has a length sufficient to fit through the corresponding through-hole and to be peened within the corresponding through-hole without an excess of material.

23. The assembly as claimed in claim 21, wherein the first part is a base of a Radio Frequency (RF) housing, the at least one surface is a top of a wall of the base of the RF housing, and the second part is a cover of the RF housing.

24. The assembly as claimed in claim 21, wherein the first part and the second part are made of sheet steel.

25. The assembly as claimed in claim 21, wherein the first part and the second part are made of aluminum.

26. The assembly of claim 21, wherein the protrusions have been peened by orbital riveting.

* * * * *